United States Patent [19]
Lees

[11] 3,969,312
[45] July 13, 1976

[54] COLORED FILAMENTS
[75] Inventor: Gerard Lees, Harrogate, England
[73] Assignee: Imperial Chemical Industries Limited, London, England
[22] Filed: July 2, 1971
[21] Appl. No.: 159,242

[30] Foreign Application Priority Data
July 10, 1970  United Kingdom............... 33639/70

[52] U.S. Cl. ................................ 260/40 P; 264/78
[51] Int. Cl.² ....................... C08K 5/08; C08K 5/23
[58] Field of Search ...................... 260/40 P; 264/78

[56] References Cited
UNITED STATES PATENTS
2,571,319   10/1951   Waters et al. ................. 260/40 P X OTHER PUBLICATIONS
Soc. of Dyers & Colourists, *Colour Index 2nd Ed, 1956, Supplement*, (1963) pp. S–180, –195, –198, & –219.

*Primary Examiner*—Lewis T. Jacobs
*Assistant Examiner*—S. M. Person
*Attorney, Agent, or Firm*—Cushman, Darby & Cushman

[57] ABSTRACT

A process for the manufacture of filaments or films wherein a fiber-or film-forming polyester is melted, there is incorporated into the melt a proportion of at least one coloring material which is soluble in the melt and the resultant colored melt is extruded to form filaments or films.

8 Claims, 1 Drawing Figure

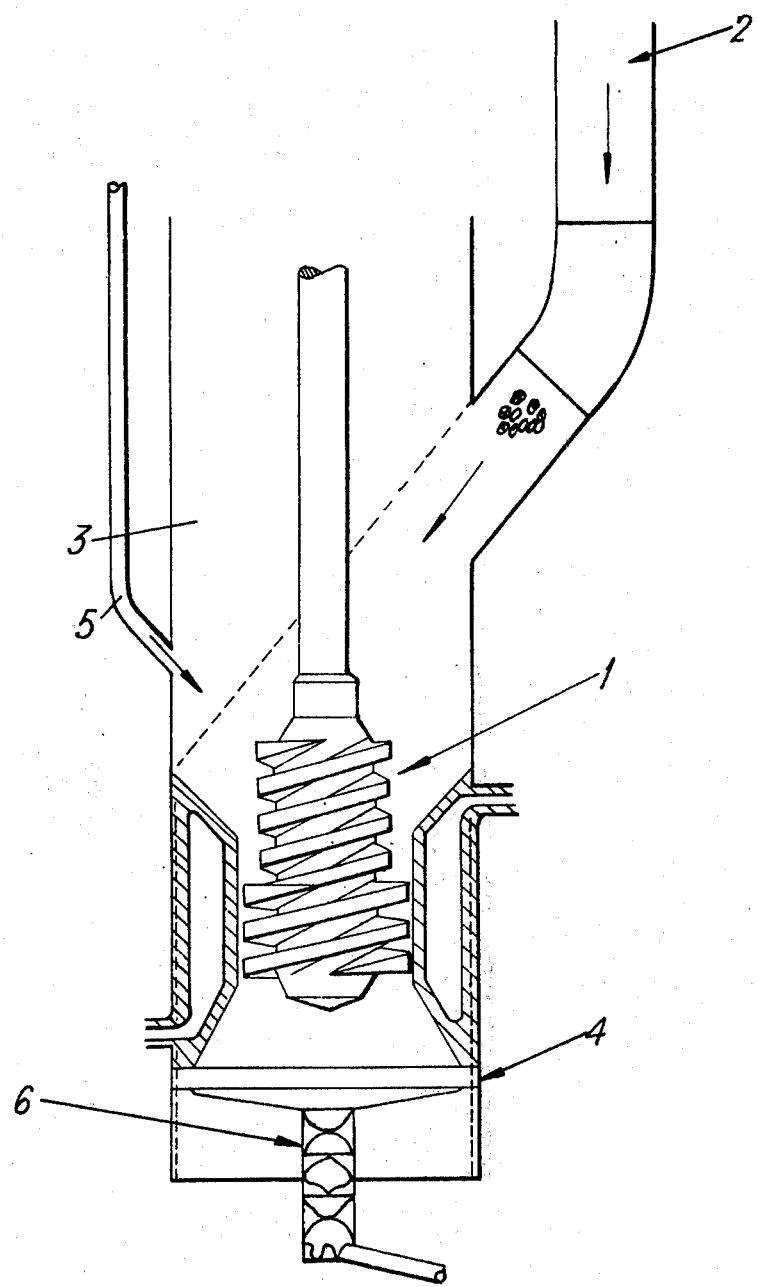

COLORED FILAMENTS

The present invention relates to the manufacture of fibres and films which are coloured, by a melt extrusion process.

In particular, our invention is applicable to polyesters.

We have found that fibres and films of particularly desirable visual appearance may be produced from thermoplastic polymers by a melt extrusion process with incorporation into the melt of at least one colouring material which is soluble in the melt. The incorporation of a soluble colouring material gives more visually desirable shades than are obtainable by the incorporation of an insoluble pigment, which allows only superficial penetration of light to the shaped article. Other advantages are better rub fastness and reduced contamination on textile machinery as compared to similar wet dyed fibres.

The colouring materials which we have found most satisfactory in respect of low cost and solubility in the melt of thermoplastic polymer, and most satisfactory in respect of attractive shade and range of colour are those which happen to be relatively unstable at elevated temperatures such as are normally encountered in melt extrusion. Thus, for example, poly(ethylene terephthalate), which is commonly employed for manufacture by the melt extrusion process of filaments and films, is normally extruded at a temperature of about 290°C. The colouring materials which are most appropriate for use according to our invention to produce particularly desirable visual effects are azo compounds which exist as disperse dyes as listed in the Color Index. These colouring materials when rapidly heated in an atmosphere of nitrogen to a temperature of 290°C. decompose virtually completely after a duration of at most 120 seconds. Examples of azo compounds falling within this class are CI Disperse Red 72, CI Disperse Orange 30, CI Disperse Red 54, CI Disperse Red 74, CI Disperse Red 167, CI Disperse Blue 79, CI Disperse Brown 4, CI Disperse Red 131, CI Disperse Orange 13, CI Disperse Violet 33, CI Disperse Red 65 and CI Disperse Blue 122.

The residence time at the temperature of extrusion, about 290°C. for poly(ethylene terephthalate), is at least 200 seconds. It is very surprising, therefore, that the colouring materials specified hereinbefore, and decomposing virtually completely after exposure for no longer time than 120 seconds at a temperature of 290°C., can survive the degree of exposure to elevated temperature necessitated by the process of incorporation of the colouring material in the melt of thermoplastic polymer.

Preferably the colouring materials used in our invention should be free from diluent, that is they should be virtually 100 percent colouring material. The colouring materials normally supplied by the trade and containing inorganic diluent material can be freed from the diluent material by extraction of the colouring material by a suitable solvent followed by evaporation of the solvent.

We have found that the colouring materials suitable for use in accordance with our invention may be selected by the following test. Colouring materials which are suitable in respect of solubility in the melt of thermoplastic polymer are further selected by mixing an accurately weighed quantity of about 1 g of the colouring material with an accurately weighed quantity of about 100 g of bis($\beta$-hydroxyethyl) terephthalate. The mixture is stirred under an atmosphere of nitrogen and heated by means of a vapour bath surrounding the container to a temperature of 282°C. Dimethyl phthalate is suitable as the heating vapour. Samples of the melt are removed periodically and analysed for colouring material content carried out by complete extraction with chlorobenzene, and spectrometric measurement of the chlorobenzene solution, using a wave length appropriate to the colouring material. To be of value in accordance with our invention, the colouring material should under this test be sufficiently stable that the loss of colour by decomposition is not greater than 10 percent per minute.

The colouring material incorporated into the thermoplastic polymer may be incorporated by any method which does not involve exposure of the colouring material to an elevated temperature for an appreciable length of time. For example the time of exposure at the spinning temperature should not exceed ten times the time to decomposition of the bulk colouring material at that temperature. Suitable methods of achieving such short residence times are the use of a screw extruder for melting the thermoplastic polymer and incorporating the colouring material in the solid state at the feed pocket, or the use of a screw pressure melting unit.

In order that the process of our invention may the more perfectly be understood, we give hereinafter some examples of methods in which it may be put into practice. Intrinsic viscosities quoted are in deciliters per g. as measured in orthochlorophenol at 25°C.

EXAMPLE 1

A round bottomed Pyrex glass test tube of 1 inch diameter and 6 inches length was sited in an oil bath in a vertical position immersed to a depth of 4 inches. The oil in the oil bath was maintained at a temperature of 290°C. while a slow stream of nitrogen was fed into the tube in such manner as to sweep out the air and ensure an inert atmosphere. 10 minutes was allowed for the temperature of the tube to reach that of the oil and then 0.25 g. of colour CI Disperse Red 72 in the form of pure dye was added quickly to the tube in the form of a free running powder. After 90 seconds the colour decomposed suddenly with ignition and evolution of dense fumes.

EXAMPLE 2

CI Disperse Red 72, in the form of pure colour powder, was metered at the rate of 2.5 g. per minute on to poly(ethylene terephthalate) chips of dimensions 5/32 inch by 5/32 inch by ⅛ inch (approximately 4 mm by 4 mm by 3 mm) which were being melted in an extruder at 250° – 260°C. and the molten material was metered through a convention polyester spinning unit at the rate of 64 pounds per hour to produce a deep red spun yarn of 9,424 filaments with total denier 5,160. The mean residence time at 290°C. was 3 minutes 20 seconds.

The spun yarn so produced was drawn at a draw ratio of 3.78:1 to give a yarn of tenacity 4.21 g. per denier and of intrinsic viscosity 0.604. The dye fastness properties were adequate for all major textile outlets.

EXAMPLE 3

Example 1 was repeated using in place of CI Disperse Red 72, the same quantity of CI Disperse Blue 79. Decomposition occurred after 73 seconds at 290°C.

EXAMPLE 4

Example 2 was repeated with the exception that in place of CI Disperse Red 72 there was used CI Disperse Blue 79. A dark blue spun yarn was produced, which after drawing had tenacity 4.22 g. per denier and intrinsic viscosity 0.59.

EXAMPLE 5

Example 1 was repeated using in place of CI Disperse Red 72, Disperse Orange 30. Decomposition occurred after 80 seconds.

EXAMPLE 6

Example 2 was repeated with the exception that in place of CI Disperse Red 72 there was used CI Disperse Orange 30 fed at a rate of 6.6 g. per minute. A deep orange spun yarn was produced. After drawing, the yarn had tenacity 4.68 g. per denier and intrinsic viscosity 0.60. The residence time of the colouring material at 290°C. was 5 minutes.

EXAMPLE 7

Example 1 was repeated using in place of CI Disperse Red 72, the same quantity of CI Disperse Blue 122. Decomposition occurred after 53 seconds.

EXAMPLE 8

Example 2 was repeated with the exception that in place of CI Disperse Red 72 there was used CI Disperse Blue 122. A blue spun yarn was produced. After drawing, the yarn had tenacity 4.2 g. per denier and intrinsic viscosity 0.604.

EXAMPLE 9

In this Example the apparatus used for the incorporation of the colouring material into the polymer melt was a screw pressure melting unit according to FIG. 1, in which a screw 1 rotates in such a sense that polymer chip fed into the chip feed tube 2 and falling by gravity into the chamber 3 is screwed down onto the silver plate 4. The colouring material was added through the additive feed tube 5 and the melted polymer plus colouring material passed through a mixing device 6 of the type described in British Pat. Specification No. 1,122,493 and illustrated in FIG. 1 of that specification. Thence the melt passed to conventional melt spinning equipment including metering pump and spinning pack. Poly(ethylene terephthalate) in the form of chips in the form of right parallepipedons of dimensions 5/32 inch by 5/32 inch by ⅛ inch (approximately 4 mm. by 4 mm. by 3 mm.) was fed into the chip feed tube 2 and azo dye CI Disperse Red 72 in the form of pellets of approximately 5/16 inch diameter and 0.25 g. weight composed of 95 to 98 percent pure dye was metered at the rate of 30 pellets per minute onto the surface of the poly(ethylene terephthalate) chips through the additive feed tube 5. The poly(ethylene terephthalate) and dye were melted at the silver plate 4 and passed through the mixing device 6 at the rate of 120 pounds per hour of the poly(ethylene terephthalate) plus colouring material and forwarded to spinnerets to produce yarn of 1,008 filaments with total decitex 11,460. The spun yarn so produced was drawn at a draw ratio of 3.78:1 to give a yarn of intrinsic viscosity 0.581. The dye fastness properties were adequate for all major textile outlets.

What we claim is:

1. A process for the manufacture of filaments or films which comprises forming a melt of a fiber or film-forming polyester including a proportion of at least one coloring material which is soluble in the melt and extruding the colored melt to form filaments or films, said coloring matter being a disperse azo dye as listed in the Color Index and being further characterized by decomposing substantially completely when heated in a nitrogen atmosphere at 290°C for no longer than 120 seconds, said melt being extruded at a temperature and time in excess of the time and temperature at which said coloring matter decomposes.

2. A process according to claim 1 wherein the coloring material is such that when exposed at a temperature of 282°C. in admixture with bis($\beta$-hydroxyethyl) terephthalate at a concentration of 1 g. of coloring material to 100 g. of bis($\beta$-hydroxyethyl) terephthalate, the rate of decomposition of coloring material does not exceed 10 percent per minute.

3. A process according to claim 1 wherein the coloring material is CI Disperse Red 72, CI Disperse Orange 30, CI Disperse Red 54, CI Disperse Red 74, CI Disperse Red 167, CI Disperse Blue 79, CI Disperse Brown 4, CI Disperse Red 131, CI Disperse Orange 13, CI Disperse Violet 33, CI Disperse Red 65 or CI Disperse Blue 122.

4. A process according to claim 1 wherein during the addition to and incorporation into the polyester of coloring material, the coloring material, whether separate or incorporated, has an exposure at the extrusion temperature not exceeding ten times the time to decomposition of the bulk coloring material at that temperature.

5. A process according to claim 1 wherein the incorporation of coloring material is effected by the use of a screw extruder.

6. A process according to claim 1 wherein the incorporation of coloring material is effected by the use of a screw pressure melting unit.

7. A process according to claim 1 wherein the polyester is poly(ethylene terephthalate).

8. A process according to claim 1 wherein the polyester is extruded at about 290°C.

* * * * *